3,494,892
MANUFACTURE OF THERMOSETTING RESINS COMPRISING THE REACTION OF A PHENOL, FORMALDEHYDE AND A BORON OXIDE WHEREIN THE BORON OXIDE IS DISSOLVED IN THE PHENOL PRIOR TO CONDENSATION WITH FORMALDEHYDE
Franz Josef Huster, Troisdorf, Germany, assignor to Dynamit Nobel Aktiengesellschaft, Troisdorf, Bezirk Cologne, Germany, a corporation of Germany
No Drawing. Filed Jan. 20, 1967, Ser. No. 610,494
Claims priority, application Germany, Jan. 20, 1966, D 49,174
Int. Cl. C08g 33/18, 5/06
U.S. Cl. 260—57                                                    7 Claims

ABSTRACT OF THE DISCLOSURE

This specification discloses an improved phenolic-aldehyde production process utilizing a boron containing compound. The boron is incorporated into the resinous composition by dissolution of a boron compound in the phenolic reactant at at least about 120° C. and condensation of this phenolic solution with an appropriate aldehyde in much the same manner as in the prior art. By operating according to this invention, advantage is gained by permitting incorporation of higher quantities of boron into the composition without the addition of excess water to the system.

---

This invention relates to a process for the production of thermosetting resins. It more particularly refers to an improved process for the production of phenolic-aldehyde condensation resins.

The manufacture of phenolic-aldehyde resins is a very old and well recognized art. This type of resins and products made therefrom have been known for many years. Production of this type of resin generally involves a one or two step condensation of a phenol suitably unsubstituted, and an aldehyde, suitably formaldehyde to form a hard thermo-setting material.

In recent years it has been discovered that it is advisable to incorporate boron into such resinous compositions in order to improve the physical properties of the final product, notably the hardness thereof, and to increase the speed of cross linking in so-called two-step resins which are hardened, e.g. with hexamethylene tetramine. This boron has been incorporated in catalytic amounts, e.g. 0.5 to 2 weight percent, along with the phenol and the formaldehyde. Where larger quantities of boron have been desired, about 3 to 30 parts of boric acid or boric oxide, based upon 100 parts of phenol-formaldehyde content, a strong acid, and solvent water have been employed in order to form a relatively homogenous liquid phase reaction medium. Upon completion of the condensation reaction, the water of reaction and the initially added water must be removed. This has generally been accomplished by distillation. Unfortunately, water and phenol form an azeotrope. Thus there are two apparent problems both of which stem from the fact that water is added to the reaction mixture. In the first place, the removal of water from the reaction mixture during or after reaction is economically undesirable since such removal requires energy input into the system. In the second place, since water and phenol form an azeotrope, phenol is "lost" through azeotropic distillation with the water. A further disadvantage brought about by the azeotropic distillation in that the water-phenol product generally has too high a phenol content to meet many governmental industrial waste specifications. Still further it would be economically more desirable to recover the phenol content of the waste stream for reuse in the condensation reaction. Breaking the water-phenol azeotrope is generally not a straightforward matter of distillation but must be accomplished by other means such as extraction, etc., which are themselves expensive, and economically technically undesirable.

It is therefore an object of this invention to provide a novel process for producing phenol-aldehye condensation products.

It is a further object of this invention to provide novel, high boron-containing, phenol-aldehyde condensation products.

Other and additional objects of this invention will become apparent from a consideration of this entire specification including the claims appended hereto.

In accord with and fulfilling these objects, one aspect of this invention resides in dissolving a boron containing compound in a molten phenol at temperatures of at least about 120° C. in such quantity that about 0.5 to 3 moles of boron compound are present per mole of phenolic compound. This solution is then reacted with one or more appropriate aldehydes in a conventional fashion to produce a phenol-aldehyde condensation resin.

Phenolic compounds within the scope of this invention are those having a melting point below about 120° C. and a boiling point above this temperature. These phenolic compounds have at least one unsubstituted ortho or para formaldehyde-reactive position. These phenolic compounds may be mono or poly substituted with, for example, halogen, alkyl, aryl or lower alkoxy groups. Exemplary of the halogen substituents are fluorine and chlorine. Exemplary of the alkyl substituents are methyl, ethyl, n-propyl, isopropyl, tert-butyl, nonyl and dodecyl. Exemplary of the aryl substituents are phenyl, $\alpha$-naphthyl and $\beta$-naphthyl. Exemplary of the lower alkoxy substituents are those having up to about 4 carbon atoms e.g. methoxy, ethoxy, propoxy and butoxy. It is within the scope of this invention to utilize phenols having mixed substituents thereon and/or to utilize mixtures of differently substituted phenols. It is further within the scope of this invention to provide a portion of the phenol reactant as phenol having no unsubstituted formaldehyde reactive position thereon. These compounds can have substituents as exemplified above.

It is preferred in the practice of this invention to dissolve the boron compound in the phenolic compound at temperatures above about 130 to 135° C. The dissolution and reaction (condensation) pressure may be chosen to insure an appropriate boiling point of the phenol solvent-reactant.

The reaction (condensation) is conveniently carried out with about 0.2 to 1 mole of formaldehyde per formaldehyde reactive position in the phenolic reactant. Where this ratio is about 0.2 to 0.3 formaldehyde per reactive position, the product is of the novolak type, whereas where the ratio is about 0.3 to 1 formaldehyde per reactive position, the product is of the resol type.

The aldehyde reactant of this invention may be formaldehyde or a formaldehyde yielding material e.g. paraformaldehyde, trioxane, tetraoxane lower alkanol hemiformals such as methylal, cyclohexylal, propional, etc., these latter referred to hemiformals are suitably those which are thermally or catalytically cleavable to generate formaldehyde. These catalysts are known and may be exemplified by hexamethylene tetramine, Lewis acids, boron oxides, e.g. $B_2O_3$, phosphorus oxides, e.g. $P_2O_5$, pyrophosphoric acid, phosphoric acid, etc. It is further within the scope of this invention to utilize low molecular polymethylol compounds as the source of the methylol bridging group for the resins produced hereby. These include low molecular weight condensation products of formaldehyde with phenols, ureas, melamines etc.

It is also within the scope of this invention to provide mixed aldehyde reactants which are at least about 25 mole percent formaldehyde and up to about 75 mole percent of at least one other aldehyde. Such other aldehydes may be exemplified by alphatic aldehydes, e.g. acetaldehyde, propionaldehyde, etc. or compounds which yield these aldehydes such as acetals, propionals, etc.; aromatic aldehydes, e.g. benzaldehyde, etc.; and heterocyclic aldehydes, e.g. furfural, etc.

Where aldehydes other than formaldehydes are used in this invention, the above described formaldehyde ratios are still considered to be applicable except that they should be read as aldehyde equivalents. The products of this invention generally will have a higher viscosity than those of the prior art prepared from the same reactant mole ratios due to the boron content acting as a cross linking agent. It may therefore be desirable to vary the reactant mole ratios in order to provide a product having viscosities equivalent to prior art compounds.

After the boron compound of this invention, suitably boric oxide, is dissolved in the phenolic reactant as aforesaid, the solution temperature is lowered and the aldehyde reactant is admixed therewith. A temperature of about 20 to 100° C. has been found suitable for aldehyde addition with about 70 to 90° C. being preferred. This temperature is particularly advantageous because it is possible to merely permit the boron-phenol solution to cool by standing for a relatively short time. If lower temperatures are to be used, it may be necessary to apply forced cooling e.g. by cooling water indirect heat transfer, refrigeration or other means. The aldehyde re-reactant of mixture of reactants can be conveniently added all at once or in small aliquots as the case may be.

The mixture of phenolic compound, boron oxide and aldehyde is then subjected to resinification. This resinification is best performed in a temperature range of about 80 to 100° C., although higher or lower temperatures can also be used for the purpose. At higher temperatures, however, the resinification is difficult to control, while uncatalyzed resinification at lower temperatures is generally too slow for a technical process. In the case of the resol type of resin, it is best not to exceed a maximum temperature of 100 to 105° C. Resinification can be accelerated at low temperatures, or at any temperature, by the addition of basic catalysts (e.g., hexamethylenetetramine) or acid catalysts. The use of catalysts, however, is not necessary for resinification in the preferred temperature range.

It has proven desirable after the resinification to remove by distillation the water that has been formed. In this case, of course, a small amount of phenolic compounds pass over with the water. The loss of phenolic compounds, however, is slight.

The novolaks manufactured according to the invention can be hardened into shaped objects of any dimensions and forms in the manner customary with novolaks, e.g. with hexamethylenetetramine. The rate of hardening is faster than it is with conventional resins. The resultant shaped objects possess a high surface hardness, resistance to high temperatures, and low shrinkage.

The following examples are illustrative of the practice of this invention without being limiting thereon.

EXAMPLE 1

400 grams of boric oxide were stirred into a fused mass of 1500 g. of phenol at about 140° C. The boric oxide went into solution within 1 minute. After the solution had cooled to about 100 to 110° C., 168 g. of paraformaldehyde were added in such a manner that the temperature was maintained at this level without further input of heat. Then the reaction mixture was heated to 160° C. The remaining amount of paraformaldehyde (168 g.) was likewise added at 100 to 110° C. Then the resin was slowly heated to about 200° C., whereupon 180 grams of a mixture of phenol and water were removed through a distillation bridge. The softening point of the novolak thus obtained is around 70° C.

A molding compound was prepared from this resin in a conventional manner by the roller-mill process. It consisted of the following:

|  | Parts |
|---|---|
| Novolak | 30.0 |
| Asbestos | 51.5 |
| Fluorspar | 10.0 |
| Hexamethylenetetramine | 4.0 |
| Zinc stearate | 2.5 |
| CaO | 2.0 |
|  | 100.0 |

This compound was pressed into test specimens at a pressure of 400 kg./cm.² for 10 minutes at 160–176° C., and the properties were determined.

| Mechanical Properties | Direct | After 168 hours of curing at 260° C. | After 75 hours of curing at 300° C. |
|---|---|---|---|
| Bending strength (Kg./cm.²) (per DIN 53452) | 340 | 300 | 270 |
| Impact strength (cm. Kg./cm.²) per DIN 53453 | 1.8 | 1.8 | 1.7 |
| Martens stability of shape (° C.) per DIN 53458 | 143 | >200 | >200 |
| Shrinkage, (percent) (per DIN 53464) | −0.13 | −0.48 | −0.57 |
| Ball impression hardness (per DIN 53456=determination or surface hardness) | >4,500 | | |

EXAMPLE 2

74.5 g. of boric oxide were dissolved in 200 g. of phenol at 145° C. with stirring. 22 g. of paraformaldehyde were slowly added to this solution at 105–110° C., and then the reaction mixture was heated to 130° C. After about 30 minutes the reaction up to this point had ended. The rest of the paraformaldehyde (22.6 g.) was added, again at 105–110° C. The resin was then heated to 125–130° C. and stirred at this temperature for 2 hours. Approximately 11 ml. of a mixture of water and phenol could be drawn off by means of a vacuum. Softening range (Kofler-Bank): 51–53° C., drying loss (1 hour of curing at 150° C.): 2.1%.

EXAMPLE 3

91 g. of boric oxide were dissolved with agitation at 145° C. in 200 g. of phenol and resinified with paraformaldehyde in a manner similar to Example 2. On account of the higher viscosity of the boric oxide solution, part of the paraformaldehyde (11.5 g.) was replaced by trioxan.

EXAMPLE 4

100 g. of boric oxide were dissolved with stirring at 145° C. in 219 g. of cresol consisting of equal parts of o-, m- and p-cresol and reacted with 31.1 g. of paraformaldehyde and 10.7 g. of trioxan, in the same manner as described in Example 3.

EXAMPLE 5

350 g. of boric oxide were added with stirring, at about 138° C., to 1410 g. of melted phenol. After the solution had cooled to about 90–100° C., 54 g. of paraformaldehyde were added with continued cooling. The main amount of the paraformaldehyde (486 g.) was added in such a manner that the temperature did not rise above 70° C. nor drop below 60° C. After the addition of paraformaldehyde had ended, the temperature was raised by heating to 100° C. After a period of about 3 hours at 100° C., the resin has a B-time (measured at 130° C. in the block) of 3.5 minutes and a 90% solid resin content (measured 1 hour at 150° C.). A molding compound made from this resin in the conventional manner and containing asbestos filler yielded the following bending strength figures based on standard test pieces per DIN 53452, as compared with a corresponding phenolic resin and asbestos molding compound (figures in parentheses).

| Curing Temp. (° C.) | Curing (hours) | | | | | |
|---|---|---|---|---|---|---|
| | 0 | 24 | 48 | 168 | 336 | 960 |
| Directly after pressing | 440(770) | | | | | |
| 200 | | 725(860) | | | | |
| 230 | | | 730(645) | 740 | 690(285) | 610(105) |
| 260 | | | 715 | 675 | 575 | 400 |

EXAMPLE 6

57 g. of boric oxide were added with stirring, at 140° C., to a mixture of 100 g. of cresol consisting of equal parts of para-, ortho- and meta-cresol, the boric oxide going into solution within 5 to 8 minutes. The solution was then cooled to 50–60° C., a small amount of trioxan having been added at 100° C., a small amount of trioxan having been added at 100° C. to prevent excessively high viscosity. The main quantity of formaldehyde (total 16.7 g. trioxane and 16.7 g. paraformaldehyde) was added at 50–60° C., that is, first the trioxane and then the paraformaldehyde. After the addition of these substances, the mixture was cautiously heated to 100° C. and the resin was condensed at this temperature to the desired degree of condensation.

EXAMPLE 7

160 g. of boric oxide were dissolved at 140–145° C. in 240 g. of phenol with agitation. After the mixture had cooled to about 100° C., 45 g. of trioxane and 45 g. of paraformaldehyde were added with additional cooling, care being taken to see that the main quantity was added at about 40° C. Then the mixture was cautiously heated to 95–100° C., and condensed at this temperature to the desired degree of condensation.

The process of this invention could not be performed at all except for the discovery of the solubility of boron oxide in phenols at temperatures above about 120° C. in almost limitless proportions since below this temperature the limit of solubility is up to about 20 weight percent at most and at this proportion too little boron can be inserted into the reaction product.

What is claimed is:
1. In the process for the production of aldehydephenolic compound condensation resinous products containing boron therein, which process comprises condensing a mixture of at least one aldehyde, at least one phenolic compound, and a boron oxide; the improvement which comprises dissolving the boron oxide in the phenolic compound at temperatures of at least about 120° C. in a proportion of about 0.5 to 3 moles of boron oxide per mole of phenolic compound; cooling the solution to about 20 to 100° C.; adding about 0.2 to 1 mole of aldehyde per aldehyde reactive position on said phenolic compound; and then substantially simultaneously condensing such aldehyde, boron oxide and phenolic compound.

2. The improved process claimed in claim 1, wherein said aldehyde is formaldehyde.

3. The improved process claimed in claim 1 wherein said solution is accomplished at at least about 130° C.

4. The improved process claimed in claim 1 wherein said aldehyde is at least about 25 mole percent formaldehyde.

5. The improved process claimed in claim 1 wherein said phenolic reactant contains up to about 35 mole percent of phenol having no formaldehyde reactant position thereon.

6. The improved process claimed in claim 1 wherein said aldehyde is at least about 25 mole percent formaldehyde and up to about 75 mole percent of at least one member selected from the group consisting of other phenolic reactive aldehydes and compounds capable of generating such other aldehydes.

7. The improved process claimed in claim 6, wherein the solution is cooled to 70 to 90° C.

References Cited

UNITED STATES PATENTS

| 2,623,866 | 12/1952 | Twiss et al. | 260—37 |
| 2,855,382 | 10/1958 | Mitchell | 260—57 |
| 3,332,911 | 7/1967 | Huck | 260—57 |

WILLIAM H. SHORT, Primary Examiner

H. SCHAIN, Assistant Examiner

U.S. Cl. X.R.

260—38, 51, 52, 53, 55, 56, 59; 264—331